United States Patent
Seo et al.

(10) Patent No.: US 11,084,911 B2
(45) Date of Patent: Aug. 10, 2021

(54) METHOD OF PRODUCING SEALING MEMBER FOR FUEL CELL AND RUBBER COMPOSITION FOR MOLDING

(71) Applicant: TOYODA GOSEI CO., LTD., Kiyosu (JP)

(72) Inventors: Akishige Seo, Kiyosu (JP); Mitsue Tanaka, Kiyosu (JP); Kenichiro Kaneko, Kiyosu (JP); Yoshiaki Mase, Kiyosu (JP); Hidekazu Kurimoto, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 277 days.

(21) Appl. No.: 16/355,925

(22) Filed: Mar. 18, 2019

(65) Prior Publication Data
US 2019/0300663 A1    Oct. 3, 2019

(30) Foreign Application Priority Data

Mar. 28, 2018  (JP) .............................. JP2018-062031
Jan. 25, 2019  (JP) .............................. JP2019-011095

(51) Int. Cl.
*C08F 210/18*   (2006.01)
*C08J 5/12*   (2006.01)
(Continued)

(52) U.S. Cl.
CPC .......... *C08J 5/121* (2013.01); *B29C 45/14336* (2013.01); *C08F 210/18* (2013.01);
(Continued)

(58) Field of Classification Search
CPC .... C08J 5/121; C08J 2323/26; C08J 2347/00; C08J 2483/05; C08F 210/18; C08F 8/42;
(Continued)

(56) References Cited

U.S. PATENT DOCUMENTS 6,013,729 A * 1/2000 Tsujimoto ............ C08K 5/5419
                                                             525/105
2005/0020740 A1   1/2005 Matsunaga et al.
(Continued)

FOREIGN PATENT DOCUMENTS

JP   2007/296669   * 11/2007
JP   4241383 B2    1/2009
(Continued)

OTHER PUBLICATIONS

Translation of JP 2007/296669 (2007) (Year: 2007).*
Tsai, Journal of Elastomers and Plastics, vol. 41, May 2009, p. 209-221 (Year: 2009).*

*Primary Examiner* — Robert C Boyle
(74) *Attorney, Agent, or Firm* — Posz Law Group, PLC (57) ABSTRACT

A method of producing a sealing member for a fuel cell includes: setting a base material made of a modified polypropylene in a mold; bringing a hydrosilicone crosslinked ethylene/α-olefin/non-conjugated diene copolymer into contact with the base material and performing molding in the mold; and vulcanizing the hydrosilicone crosslinked ethylene/α-olefin/non-conjugated diene copolymer and at the same time, bonding the hydrosilicone crosslinked ethylene/α-olefin/non-conjugated diene copolymer and the base material by vulcanization, in the mold with a molding temperature set to a temperature that is higher than a vulcanization start temperature of the hydrosilicone crosslinked ethylene/α-olefin/non-conjugated diene copolymer and lower than a melting point of the modified polypropylene.

6 Claims, 3 Drawing Sheets

(51) Int. Cl.
- *B29C 45/14* (2006.01)
- *H01M 8/0284* (2016.01)
- *C08J 3/24* (2006.01)
- *B29K 105/00* (2006.01)
- *B29K 623/00* (2006.01)
- *B29L 31/26* (2006.01)
- *B29K 9/00* (2006.01)

(52) U.S. Cl.
CPC ........... *C08J 3/245* (2013.01); *H01M 8/0284* (2013.01); *B29K 2009/00* (2013.01); *B29K 2105/0085* (2013.01); *B29K 2623/12* (2013.01); *B29L 2031/26* (2013.01); *C08F 2810/20* (2013.01); *C08J 2323/12* (2013.01); *C08J 2323/26* (2013.01)

(58) Field of Classification Search
CPC .............. C08F 2810/20; H01M 8/0284; B29K 2023/16; B29K 2023/12; B32B 25/04; B32B 25/16; B32B 25/14; C08G 77/12
See application file for complete search history.

(56) References Cited

U.S. PATENT DOCUMENTS

| | | | |
|---|---|---|---|
| 2011/0092631 | A1 | 4/2011 | Hasegawa |
| 2012/0018927 | A1 | 1/2012 | Watanabe |

FOREIGN PATENT DOCUMENTS

| | | | |
|---|---|---|---|
| JP | 4993077 | B2 | 5/2012 |
| JP | 5334409 | B2 | 8/2013 |
| JP | 5585754 | B2 | 8/2014 |

* cited by examiner

METHOD OF PRODUCING SEALING MEMBER FOR FUEL CELL AND RUBBER COMPOSITION FOR MOLDING

TECHNICAL FIELD

The present invention relates to a method of producing a sealing member for a fuel cell and a rubber composition for molding.

BACKGROUND ART

Typically, a fuel cell has a stack structure in which a plurality of cells are stacked, and each of the cells includes a film electrode complex constituted of a fuel electrode/an electrolyte film/an air electrode, a pair of separators having flow paths which secure electrical connection to the fuel electrode or the air electrode and through which a fuel or air is separately supplied, and a sealing member for preventing a reaction gas from leaking to the outside between the separators.

A sealing member is generally an elastic article, and regarding a material of an elastic component, a fuel cell sealing part, a hard disk drive top cover gasket part, and a wire connector sealing part made of an ethylene/α-olefin/non-conjugated polyene copolymer crosslinked (hydrosilicone-crosslinked) due to a hydrosilylation reaction are disclosed in Patent Documents 1 and 2.

CITATION LIST

Patent Documents

[Patent Document 1] Japanese Patent No. 5334409 (JP 5334409 B)
[Patent Document 2] Japanese Patent No. 4241383 (JP 4241383 B)

SUMMARY OF INVENTION

Technical Problem

Currently, as one of proposed product specifications for a fuel cell sealing part, a product obtained by bonding an elastic article to a resin base material has been studied. Here, in Patent Documents 1 and 2, only bonding a hard disk drive top cover and a gasket part with an adhesive is described, and there is no description regarding bonding the copolymer and a resin base material for the fuel cell sealing part.

Regarding candidate materials for such a fuel cell sealing part, the present inventors studied a product obtained by bonding ethylene propylene diene rubber (EPDM) having various excellent characteristics such as heat resistance and a modified polypropylene (PP) base material, which can be bonded to each other.

As a method of bonding them, first, the present inventors studied a method in which EPDM and a modified PP are molded and then bonded with an adhesive. However, it was difficult to adopt this method because there are problems that a process of applying an adhesive is necessary, it is difficult to perform positioning for bonding and the production efficiency is poor, for example.

Then, the present inventors studied so-called vulcanization bonding in which bonding is simultaneously performed while a rubber is vulcanized during heating and pressing with the unvulcanized EPDM and the modified PP in contact each other. However, this was difficult to perform with the related art. This is because general EPDM obtained by sulfur crosslinking is generally vulcanized at a vulcanization temperature of 150° C. or higher, but the modified PP has a melting point of about 140° C. depending on a molecular structure, and when the vulcanization bonding is performed at a rubber vulcanization temperature, a resin melts, and a laminate is deformed and breaks.

The present invention is for producing a sealing member for a fuel cell, which is obtained by vulcanization bonding of an ethylene/α-olefin/non-conjugated diene copolymer and a modified PP base material without melting a base material made of a modified PP with heat during vulcanization.

Solution to Problem

The present inventors focused on hydrosilicone crosslinking of EPDM. A vulcanization start temperature in hydrosilicone crosslinking of EPDM is lower than 90° C. However, 90° C. is a temperature during kneading, for example, and vulcanization is generally performed at a vulcanization temperature of 150° C. to 160° C. It was found that, when vulcanization is performed at a temperature lower than a melting point of a modified PP, for example, a low vulcanization temperature of 90° C. to 130° C., a vulcanization bonding component in which a modified PP is not deformed or broken is obtained.

(1) A method of producing a sealing member for a fuel cell of the present invention includes: setting a base material made of a modified PP in a mold; bringing a hydrosilicone crosslinked ethylene/α-olefin/non-conjugated diene copolymer into contact with the base material and performing molding in the mold; and vulcanizing the hydrosilicone crosslinked ethylene/α-olefin/non-conjugated diene copolymer, and at the same time, bonding the hydrosilicone crosslinked ethylene/α-olefin/non-conjugated diene copolymer and the base material by vulcanization, in the mold with a molding temperature set to a temperature that is higher than a vulcanization start temperature of the hydrosilicone crosslinked ethylene/α-olefin/non-conjugated diene copolymer and lower than a melting point of the modified PP.

The molding temperature is preferably 90° C. to 130° C., and more preferably 100° C. to 130° C. When the molding temperature is lower than 90° C., vulcanization based on hydrosilicone crosslinking of the ethylene/α-olefin/non-conjugated diene copolymer is less likely to progress, and when the molding temperature is 130° C. or higher, there is a risk of the modified PP melting.

A timing at which the temperature is raised to the molding temperature may be before or during the molding process, or may be before or during the vulcanization process.

[Action]

In the vulcanization process, in the mold with a molding temperature set to a temperature that is higher than a vulcanization start temperature of the hydrosilicone crosslinked ethylene/α-olefin/non-conjugated diene copolymer and lower than a melting point of the modified PP, the hydrosilicone crosslinked ethylene/α-olefin/non-conjugated diene copolymer is vulcanized, and at the same time, the hydrosilicone crosslinked ethylene/α-olefin/non-conjugated diene copolymer and the modified PP base material are bonded by vulcanization. Therefore, the base material does not melt due to heat during vulcanization, and a process of separately applying an adhesive is not necessary.

In addition, when the base material is set in the mold in the setting process (setting itself is easy), the hydrosilicone crosslinked ethylene/α-olefin/non-conjugated diene copolymer is brought into contact with the base material and molded in the molding process and is bonded by vulcanization to the base material in the vulcanization process. Therefore, positioning for bonding is simple (practically unnecessary).

(2) A rubber composition for molding of the present invention includes an ethylene/α-olefin/5-vinyl-2-norbornene random copolymer, and with respect to 100 parts by mass of the ethylene/α-olefin/5-vinyl-2-norbornene random copolymer, 1.0 part by mass to 10.0 parts by mass of a hydrosilicone compound as a crosslinking agent; 0.1 parts by mass to 1.0 part by mass of a hydrosilylation reaction promoting catalyst; and 0.1 parts by mass to 1.2 parts by mass of a reaction inhibitor, wherein an induction time $t_c(10)$ (JIS K6300-2) at a vulcanization temperature of 110° C. is 10 minutes or more.

[Action]

A mechanism by which the hydrosilicone crosslinked ethylene/α-olefin/non-conjugated diene copolymer and the base material made of a modified PP are bonded by vulcanization is inferred to be a chemical interaction between an SiH group of the hydrosilicone compound and a functional group of the modified PP. The hydrosilicone compound generally reacts with the ethylene/propylene/5-vinyl-2-norbornene random copolymer at a highspeed, and rapidly crosslinks the same copolymer. Therefore, in a part in which the same copolymer preferentially reacts with the hydrosilicone compound, a chemical interaction with the functional groups of the modified PP does not occur, bonding with the modified PP does not occur, and microscopic separation occurs.

When the rubber composition is formulated as described above and $t_c(10)$ is controlled such that it becomes 10 minutes or more, the reaction rate of the hydrosilicone compound is slowed. Then, when the rubber composition flows on the surface of the modified PP base material, the hydrosilicone compound reacts with the same copolymer and a sufficient chemical interaction with the functional groups of the modified PP base material occurs. Therefore, an area in which rubber is in close contact with and bonded the modified PP increases, and vulcanization bonding can be performed with high strength. The upper limit of $t_c(10)$ is not particularly limited, and may be 60 minutes in consideration of molding efficiency.

Advantageous Effects of Invention

According to the production method of the present invention, it is possible to produce a sealing member for a fuel cell obtained by vulcanization bonding of an ethylene/α-olefin/non-conjugated diene copolymer and a modified PP base material without melting a base material made of a modified PP with heat during vulcanization, which has an excellent effect of not requiring a process of applying an adhesive and positioning being simple during bonding.

With the rubber composition for molding of the present invention, vulcanization bonding between the ethylene/α-olefin/non-conjugated diene copolymer and the base material is enhanced, and thus it is possible to improve a peeling strength.

DESCRIPTION OF EMBODIMENTS

<1> Hydrosilicone Crosslinked Ethylene/α-Olefin/Non-Conjugated Diene Copolymer

α-Olefins are not particularly limited, and examples thereof include propylene, 1-butene, 1-pentene, 1-hexene, 4-methyl-1-pentene, 1-octene, and 1-decene. Among these, propylene or 1-butene is preferable, and propylene is particularly preferable.

A non-conjugated diene is not particularly limited, and examples thereof include 1,4-hexadiene, dicyclopentadiene, 5-ethylidene-2-norbornene, and 5-vinyl-2-norbornene. Among these, 5-vinyl-2-norbornene is preferable.

[Crosslinking Agent]

Hydrosilicone crosslinking is caused when a crosslinking agent made of a hydrosilicone compound (a compound having SiH groups) is added. Examples of the hydrosilicone compound include a compound which is represented by the following General Formula [Chem. 1] and having an SiH group at both ends of a molecule and two SiH groups in one molecule and a compound which is represented by the following General Formula [Chem. 2] and having an SiH group at three ends of a molecule and three SiH groups in one molecule.

[Chem. 1]

In General Formula [Chem. 1], $R^1$ is a monovalent group having 1 to 10 carbon atoms and is an unsubstituted or substituted saturated hydrocarbon group or an aromatic hydrocarbon group, and $R^1$'s may be the same as or different from each other in one molecule. Specific examples of $R^1$ include a methyl group, an ethyl group, a propyl group, an isopropyl group, a butyl group, an amyl group, a cyclopentyl group, a hexyl group, a cyclohexyl group, an octyl group, a chloromethyl group, a 2-chloroethyl group, a 3-chloropropyl group, a phenyl group, a phenylmethyl group, a 2-phenylethyl group, and a 2-phenylpropyl group. A methyl group, an ethyl group, and a phenyl group are preferable.

a is an integer of 0 to 20, b is an integer of 0 to 20. Both a and b are preferably 10 or less, more preferably 5 or less, particularly preferably 2 or less, and most preferably a and b are equal and both a and b are 2 or less.

$R^2$ is a divalent organic group having 1 to 30 carbon atoms or an oxygen atom.

When a rubber composition includes a compound [Chem. 1] having an SiH group at both ends of a molecule and two SiH groups in one molecule, preferably 1.0 part by mass to 10.0 parts by mass of the compound is included with respect to 100 parts by mass of the ethylene/α-olefin/non-conjugated diene copolymer.

[Chem. 2]

In General Formula [Chem. 2], $R^3$ is a monovalent group having 1 to 10 carbon atoms and is an unsubstituted or substituted saturated hydrocarbon group or an aromatic hydrocarbon group, and $R^3$'s may be the same as or different from each other in one molecule. Specific examples of $R^3$ are the same as specific examples of $R^1$, and are preferably a methyl group, an ethyl group, and a phenyl group.

a, b and c are independently an integer of 0 to 20, and a, b and c are all preferably 10 or less, more preferably 5 or less, and particularly preferably 2 or less, and most preferably a, b and c are equal and a, b and c are all 2 or less.

$R^4$ is a trivalent organic group having 1 to 30 carbon atoms, and is preferably a silicon-containing trivalent organic group having 1 to 30 carbon atoms.

When a rubber composition includes a compound [Chem. 2] having an SiH group at three ends of a molecule and having three SiH groups in one molecule, preferably 1.0 part by mass to 10.0 parts by mass of the compound is included with respect to 100 parts by mass of the ethylene/α-olefin/non-conjugated diene copolymer.

<2> Hydrosilylation Reaction Promoting Catalyst

It is preferable to add a catalyst (an addition reaction catalyst) that promotes an addition reaction (a hydrosilylation reaction of an alkene, etc.) between an alkenyl group of an ethylene/α-olefin/non-conjugated diene copolymer or the like and an SiH group of a hydrosilicone crosslinking agent.

A specific example of the hydrosilylation reaction promoting catalyst is an addition reaction catalyst containing a platinum group element such as a platinum-based catalyst, a palladium-based catalyst, and a rhodium-based catalyst, and is preferably a complex of a Group 8 element metal (particularly preferably platinum) in the periodic table and a compound having a vinyl group and/or a carbonyl group.

The compound having a carbonyl group is preferably a carbonyl compound, octanal, or the like.

The compound having a vinyl group is preferably an organosiloxane having a vinyl group and particularly preferably a cyclic organosiloxane having a vinyl group.

As a specific example of a complex of such a compound and platinum, a vinylmethyl cyclic siloxane solution of a platinum-carbonyl complex, a platinum-vinylmethyl cyclic siloxane complex, a platinum-divinyltetramethyldisiloxane complex, and a platinum-octanal/octanol complex, and the like are preferable, and a platinum-carbonyl vinylmethyl cyclic siloxane complex is particularly preferable.

A catalyst including such a complex may further include a component (for example, a solvent) other than the compound having a vinyl group and/or a carbonyl group. Specific examples of the solvent include various alcohols, xylene, and the like.

A content of the hydrosilylation reaction promoting catalyst is not particularly limited, and preferably 0.1 parts by mass to 1.0 part by mass of the hydrosilylation reaction promoting catalyst is included with respect to 100 parts by mass of the ethylene/α-olefin/non-conjugated diene copolymer.

<3> Reaction Inhibitor

Since a crosslinking rate is extremely higher in hydrosilicone crosslinking than in sulfur crosslinking and peroxide crosslinking in the related art, it is preferable to use a reaction inhibitor together with the hydrosilylation reaction promoting catalyst. Examples of the reaction inhibitor include benzotriazole, an ethynyl group-containing alcohol (for example, ethynylcyclohexanol, etc.), acrylonitrile, an amide compound such as N,N-diallylacetamide, N,N-diallylbenzamide, N,N,N',N'-tetraallyl-o-phthalic acid diamide, N,N,N',N'-tetraallyl-m-phthalic acid diamide, and N,N,N',N'-tetraallyl-p-phthalic acid diamide, sulfur, phosphorus, nitrogen, an amine compound, a sulfur compound, a phosphorus compound, tin, a tin compound, tetramethyltetravinylcyclotetrasiloxane, and an organic peroxide such as a hydroperoxide.

A content of the reaction inhibitor is not particularly limited, and preferably 0.1 parts by mass to 1.2 parts by mass of the reaction inhibitor is included with respect to 100 parts by mass of the ethylene/α-olefin/non-conjugated diene copolymer.

<4> Other Formulation Materials

In addition to the above formulation materials, a filler, a plasticizer, a processing aid, an antioxidant, an acid acceptor, an antiscorching agent, a colorant, and the like can be appropriately added.

Examples of the filler include carbon black, calcium carbonate, talc, silica, and calcined clay.

Examples of the plasticizer include a petroleum-based plasticizer such as a process oil type (paraffin type, a naphthenic type, an aromatic type, etc.) lubricating oil, petroleum asphalt, and Vaseline, a coal tar type softener such as coal tar and coal tar pitch, a fatty oil type plasticizer such as castor oil, linseed oil, rapeseed oil, and coconut oil, waxes such as beeswax, carnauba wax, and lanolin, fatty acids and fatty acid salts such as ricinoleic acid, palmitic acid, barium stearate, calcium stearate, and zinc laurate, a synthetic polymer substance such as a petroleum resin, atactic polypropylene, and a coumarone indene resin, tall oil, and sub(factice).

Examples of the processing aid include a fatty acid such as stearic acid.

<5> Modified PP

A modified PP is not particularly limited, and examples thereof include an acid-modified PP and a chlorinated PP. Examples of a type of an acid of the acid-modified PP include maleic acid, itaconic acid, and citraconic acid.

<6> Molding Process

Examples of a molding process include a process in which a hydrosilicone crosslinked ethylene/α-olefin/non-conjugated diene copolymer is injected into a mold and is brought into contact with a base material, and molded in a mold and a process in which a hydrosilicone crosslinked ethylene/α-olefin/non-conjugated diene copolymer is placed on a base material and press-molded in a mold.

EXAMPLES

Test pieces of Examples 1 and 2 and Comparative Examples 1, 2, and 3 were produced by vulcanization bonding of rubber components shown in the following Table 1 and a base material (modified PP sheet), and evaluated. Numerical values in the formulation for the rubber components are in parts by mass.

TABLE 1

| Formulation type | Formulation material | Example 1 | Example 2 | Comparative Example 1 | Comparative Example 2 | Comparative Example 3 |
|---|---|---|---|---|---|---|
| Rubber component (parts by mass) | EPDM | VNB-EPDM | 100 | 100 | 100 | 100 | 100 |
| | Filler | Carbon black, Calcium carbonate, Calcium oxide, etc. | 90 | 90 | 90 | 90 | 90 |
| | Plasticizer | Paraffin type process oil | 30 | 30 | 30 | 30 | 30 |
| | Crosslinking agent | Hydrosilicone compound | 4 | 4 | — | — | — |
| | | Peroxide | — | — | 5 | 5 | 5 |
| | Hydrosilylation reaction promoting catalyst | Platinum-based catalyst | 0.2 | 0.2 | — | — | — |
| | Reaction inhibitor | 1-ethynyl-1-cyclohexanol | 0.1 | 0.1 | — | — | — |
| Base material | | | Modified PP sheet | | | | |
| Vulcanization bonding | Condition | Vulcanization temperature (° C.) | 110 | 130 | 140 | 110 | 170 |
| | | Vulcanization time (min) | 15 | 10 | 0.5 | 15 | 10 |
| Evaluation | Whether or not vulcanization progressed | | Progressed | Progressed | Progressed | Not progressed | Progressed |
| | Whether or not the base material melted | | Not melted | Not melted | Melted | Not melted | Melted |
| | Peeling test | Fracture form | Cohesive failure | Cohesive failure | Cohesive failure | — | Cohesive failure |
| | Overall evaluation | | Satisfactory | Satisfactory | Not satisfactory | Not satisfactory | Not satisfactory |

Here, details of components used in the rubber composition are as follows.

EPDM was an ethylene/propylene/5-vinyl-2-norbornene random copolymer (VNB-EPDM) (with an amount of ethylene of 54 weight %, an amount of diene of 1.4 weight %, and a Mooney viscosity at 100° C. of 39). A vulcanization start temperature of a hydrosilicone crosslinking EPDM with the following crosslinking agent was 90° C.

The filler was a mixture of carbon black, calcium carbonate, calcium oxide, and the like.

The plasticizer was a paraffin type process oil.

The hydrosilicone compound of the crosslinking agent was a compound represented by the following Formula [Chem. 3].

[Chem. 3]

The peroxide of the crosslinking agent was a product with 40% of dicumyl peroxide (60% calcium carbonate).

The platinum-based catalyst for the hydrosilylation reaction promoting catalyst was a 0.5 wt % platinum-1,3,5,7-tetravinyl-1,3,5,7-tetramethylcyclotetrasiloxane complex isopropanol solution.

The reaction inhibitor was 1-ethynyl-1-cyclohexanol.

In addition, the modified PP sheet serving as a base material was a sheet with a thickness of 0.13 mm (MFR 9.2 g/10 min, a melting point of 140° C.) (product name "Admer QE840" (maleic anhydride modified PP) available from Mitsui Chemicals, Inc).

<Preparation of Rubber Compositions>

The rubber components of Examples 1 and 2 were kneaded using a Banbury mixer and an open roller to prepare rubber compositions. The rubber components of Comparative Examples 1, 2, and 3 were kneaded in the same manner to prepare rubber compositions.

<Production of Test Piece>

Figure 1A:
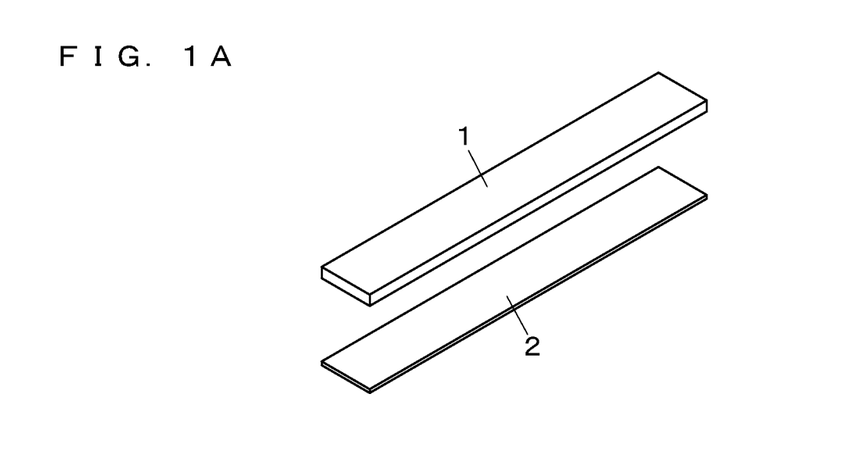
FIG. 1A is a perspective view of a rubber composition for a test piece of an example and a modified PP sheet.

As shown in FIG. 1A, each of the rubber compositions was formed into a flat rubber composition 1 with a width of 10 mm, a length of 70 mm, and a thickness of 1.0 mm.

This (unvulcanized) flat rubber composition was placed on a surface of a modified PP sheet 2 with a width of 10 mm, a length of 70 mm, and a thickness of 0.13 mm in an overlapping manner.

Figure 1B:
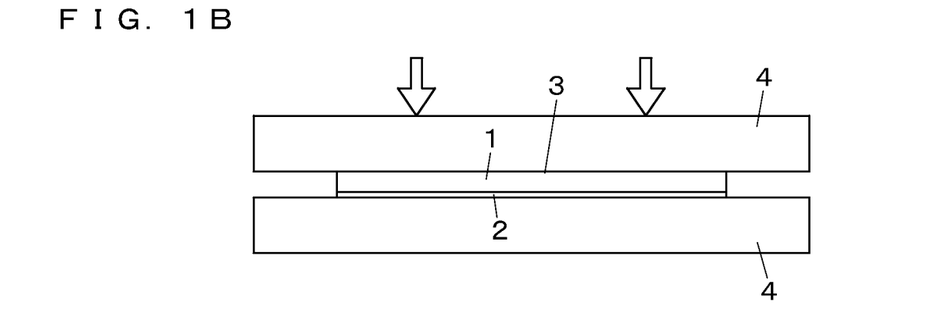
FIG. 1B is a side view of the test piece of the example that is pressed and bonded by vulcanization for production.

Next, as shown in FIG. 1B, this overlapping article was interposed between two metal plates 4 kept at a vulcanization temperature shown in Table 1, left for a vulcanization time shown in Table 1 while pressing from the rubber composition 1 side, and the rubber composition 1 was vulcanized, and at the same time, the rubber composition 1 and the modified PP sheet 2 were bonded by vulcanization to produce a test piece 3. The vulcanization temperatures in Examples 1 and 2 were higher than the vulcanization start temperature of the hydrosilicone crosslinking EPDM and lower than the melting point of the modified PP.

<Evaluations>

At the time of vulcanization, whether or not vulcanization progressed was separately determined according to a vulcanization degree test using a Curelastometer, and when vulcanization progressed, this was evaluated as "good" and otherwise, this was evaluated as "not satisfactory."

At the time of vulcanization, whether or not the base material melted was determined by visually observing the modified PP sheet after the test piece was produced, and when the base material did not melt, this was evaluated as "good," and otherwise, this was evaluated as "not satisfactory."

Figure 1C:
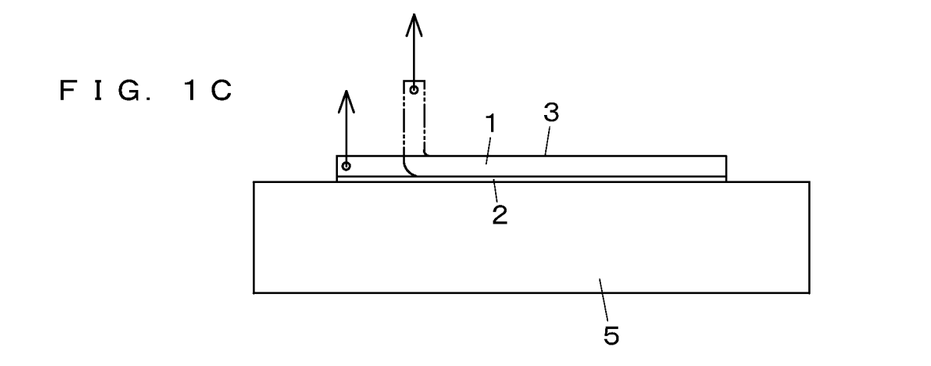
FIG. 1C is a schematic view of the same test piece on which a 90° peeling test is performed.

As shown in FIG. 1C, the modified PP sheet 2 of the test piece 3 was fixed to a predetermined jig 5 using an adhesive, and a 90° peeling test was performed by pulling the rubber composition 1 at room temperature and a test speed of 10 mm/min.

A fracture form of the test piece 1 when fracture occurred in the peeling test was visually determined, and this was evaluated as "good" in the case of cohesive failure and this was evaluated as "not satisfactory" in the case of interface fracture.

These evaluation results are shown in Table 1.

In Examples 1 and 2, all evaluations were good, and good products having an overall evaluation of being satisfactory were obtained.

On the other hand, in Comparative Examples 1 and 3, when a rubber of the related art (peroxide vulcanized product) was heated to a general vulcanization temperature (140° C. or higher), the modified PP sheet melted and a good product was not obtained. As in Comparative Example 2, when a vulcanization temperature was lowered with rubber of the related art (peroxide vulcanized product), vulcanization did not progress due to a low temperature.

Next, test pieces of Examples 3, 4, and 5, and Comparative Examples 4 and 5 (hereinafter, these may be referred to as "Example 3 and the like") were produced by vulcanization bonding of rubber components shown in the following Table 2 and a base material, and evaluated. Numerical values in the formulation for the rubber components are parts by mass.

TABLE 2

| Formulation type | Formulation material | Example 3 | Example 4 | Example 5 | Comparative Example 4 | Comparative Example 5 |
|---|---|---|---|---|---|---|
| Rubber component (parts by mass) | EPDM | VNB-EPDM | 100 | 100 | 100 | 100 | 100 |
| | Filler | Carbon black | 40 | 40 | 30 | 40 | 40 |
| | | Calcium carbonate | 40 | 40 | — | 40 | — |
| | | Calcium oxide | 10 | — | 10 | 10 | 10 |
| | Plasticizer | Paraffin type process oil | 30 | 30 | — | 30 | 30 |
| | Crosslinking agent | Hydrosilicone compound | 4 | 4 | 4 | — | 4 |
| | | Peroxide | — | — | — | 5 | — |
| | Hydrosilylation reaction promoting catalyst | Platinum-based catalyst | 0.2 | 0.2 | 0.2 | — | 0.2 |
| | Reaction inhibitor | 1-ethynyl-1-cyclohexanol | 0.3 | 0.1 | 0.1 | — | 0.1 |
| Base material | | | Modified PP sheet | | | | |
| Vulcanization bonding | Condition | Vulcanization temperature (° C.) | 110 | 110 | 110 | 110 | 110 |
| | | Vulcanization time (min) | 60 | 55 | 30 | 60 | 25 |
| Evaluation | | Vulcanization characteristic $t_c(10)$ at 110° C. (min) | 39 | 25 | 10 | — | 8 |
| | | Whether or not vulcanization progressed | Progressed | Progressed | Progressed | Not progressed | Progressed |
| | | Whether or not the base material melted | Not melted | Not melted | Not melted | Not melted | Not melted |
| | Peeling test | Fracture form | Cohesive failure | Cohesive failure | Cohesive failure | Bonding did not occur | Interface fracture |
| | | Peeling strength (N/nm) | 1.50 | 1.04 | 0.50 | — | 0.37 |
| | | Overall evaluation | Satisfactory | Satisfactory | Satisfactory | Not satisfactory | Not satisfactory |

Here, EPDM, a plasticizer, a crosslinking agent, a hydrosilylation reaction promoting catalyst, a reaction inhibitor and a base material were the same as those in Table 1 described above.

The carbon black was "Seast G-FY" (product name, available from Tokai Carbon Co., Ltd.)

The calcium carbonate was "Whiton SB red" (product name, available from Bihoku Funka Kogyo Co., Ltd.)

The calcium oxide was "VESTA-PP" (product name, available from Inoue Calcium Corporation)

The paraffin type process oil was "Diana process oil PW380" (product name, available from Idemitsu Kosan Co., Ltd.)

The rubber composition was prepared and the test piece 3 (FIGS. 1A to 1C) was produced in the same manner as in Examples 1 and 2 and Comparative Examples 1, 2, and 3 (hereinafter these may be referred to as "Example 1 and like") except for the following vulcanization conditions.

In Example 1 and the like, the vulcanization temperatures were all different, and in Example 3 and the like, the vulcanization temperature was 110° C.

In Example 1 and the like, the vulcanization time was a 50% vulcanization time (a midpoint in the vulcanize reaction) $t_c(50)$ (JIS K6300-2), but in Example 3 and the like, the vulcanization time was a 90% vulcanization time (optimal vulcanization point) $t_c(90)$ (JIS K6300-2).

The following evaluations were added to the same evaluations as in Example 1 and the like.

As a vulcanization characteristic, an induction time (vulcanization start point) $t_c(10)$ (JIS K6300-2) was measured.

The peeling strength during fracture in the peeling test was measured.

These evaluation results are shown in Table 2.

In Example 3, $t_c(10)$ was 39 minutes. This is thought to have been caused by the fact that an amount of the reaction inhibitor was more than that in the other examples.

In Example 4, $t_c(10)$ was 25 minutes. This is thought to have been caused by the fact that calcium oxide functioning as a desiccant was removed and as a result, a content of water in the composition increased and the activity of the hydrosilylation reaction promoting catalyst was inhibited.

In Example 5, $t_c(10)$ was 10 minutes. This is thought to have been caused by the fact that calcium carbonate was removed and a concentration of the crosslinking agent in the composition accordingly increased, and on the other hand, an amount of carbon black was reduced compared with in the other examples, and as a result, thermal conductivity deteriorated and crosslinking was delayed.

In Comparative Example 2, $t_c(10)$ was 8 minutes. This is thought to have been caused by the fact that calcium carbonate was removed and a concentration of the crosslinking agent in the composition accordingly increased.

Figure 3:
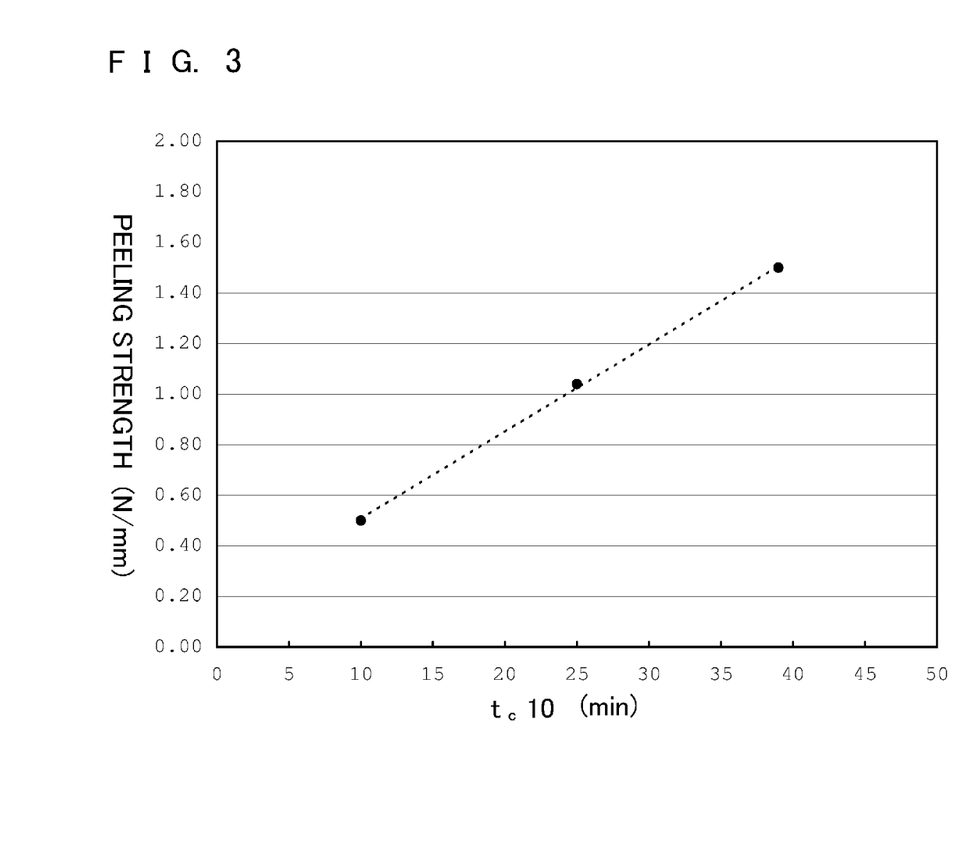
FIG. 3 is a graph showing the relationship between $t_c(10)$ and the peeling strength in Examples 3, 4, and 5.

As described above, in Examples 3, 4, and 5, $t_c(10)$ was 10 minutes or more, and all evaluations were good, and good products having an overall evaluation of being satisfactory were obtained. In addition, as shown in the relationship between $t_c(10)$ and the peeling strength of Examples 3, 4, and 5 in FIG. 3, a longer $t_c(10)$ indicates a higher peeling strength.

On the other hand, as in Comparative Example 4, when the rubber of the related art (peroxide vulcanized product) was heated to a vulcanization temperature of 110° C., vulcanization did not progress even after the vulcanization time had passed. Even in the case of hydrosilicone crosslinking as in Comparative Example 5, when $t_c(10)$ was 8 minutes, the failure form was interface failure, and the peeling strength was low.

<Molding and Vulcanization Bonding in Mold>

In production of the test piece 3, molding of the rubber composition 1 and vulcanization bonding of the rubber composition 1and the modified PP sheet 2 were separately performed. However, in the following process (FIGS. 2A and 2B), molding of the rubber composition 1 and vulcanization bonding of the rubber composition 1 and the modified PP sheet 2 were performed in a mold 6 at the same time, and a sealing member for a fuel cell was produced.

Figure 2A:
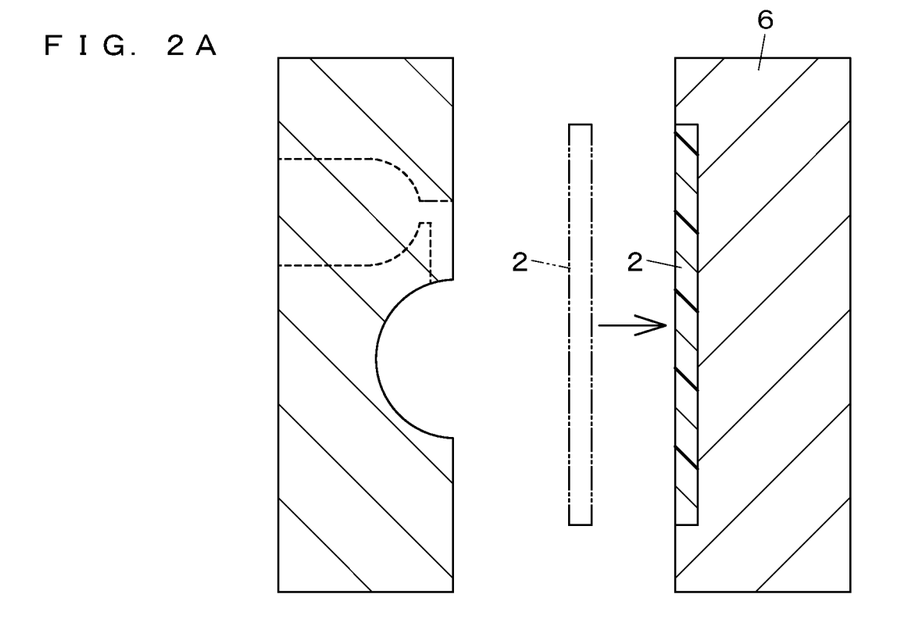
FIG. 2A is a sectional view showing a process of setting a modified PP sheet with a shape for a fuel cell in a mold.

(1) As shown in FIG. 2A, a setting process was performed in which the modified PP sheet 2 processed into a shape for a fuel cell was set in the open mold 6.

Figure 2B:
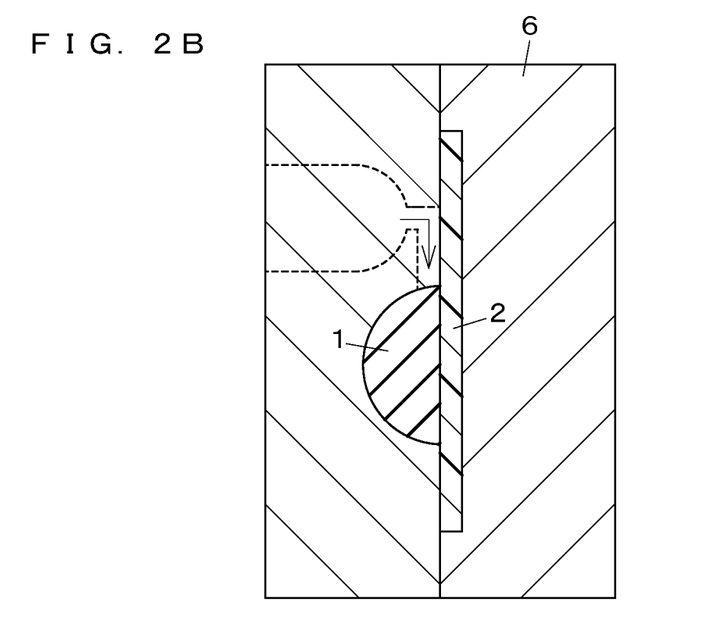
FIG. 2B is a sectional view showing a molding process in which the rubber composition of the example is injected into the mold and molded.

(2) As shown in FIG. 2B, a molding process was performed in which the rubber compositions 1 prepared in Examples 1 to 5 were injected into the closed mold 6 and molded.

(3) A vulcanization process was performed in which the rubber composition 1 was vulcanized and at the same time, the rubber composition 1 and the modified PP sheet 2 were bonded by vulcanization, in the mold 6 with a molding temperature set to the vulcanization temperature in Examples 1 to 5.

In the sealing members for a fuel cell produced as described above, the results of all the above evaluations were good and good products having an overall evaluation of being satisfactory were obtained.

Here, the present invention is not limited to the examples, and can be embodied by being appropriately changed without departing from the scope of the invention.

REFERENCE SIGNS LIST

1 Rubber composition
2 Modified PP sheet
3 Test piece
4 Metal plate
5 Jig
6 Mold

The invention claimed is:

1. A method of producing a sealing member for a fuel cell, comprising:
    setting a base material made of a modified polypropylene in a mold;
    bringing a hydrosilicone crosslinked ethylene/α-olefin/non-conjugated diene copolymer into contact with the base material and performing molding in the mold; and
    vulcanizing the hydrosilicone crosslinked ethylene/α-olefin/non-conjugated diene copolymer and at the same time, bonding the hydrosilicone crosslinked ethylene/α-olefin/non-conjugated diene copolymer and the base material by vulcanization, in the mold with a molding temperature set to a temperature that is higher than a vulcanization start temperature of the hydrosilicone crosslinked ethylene/α-olefin/non-conjugated diene copolymer and lower than a melting point of the modified polypropylene.

2. The method according to claim 1,
    wherein the molding temperature is 90° C. to 130° C.

3. The method according to claim 1,
    wherein the hydrosilicone crosslinked ethylene/α-olefin/non-conjugated diene copolymer is a rubber composition in which a hydrosilicone compound as a crosslinking agent, a hydrosilylation reaction promoting catalyst, and a reaction inhibitor are added.

4. The method according to claim 3,
    wherein the rubber composition has an induction time $t_c(10)$ (JIS K6300-2) at 110° C. of 10 minutes or more.

5. The method according to claim 2,
    wherein the hydrosilicone crosslinked ethylene/α-olefin/non-conjugated diene copolymer is a rubber composition in which a hydrosilicone compound as a crosslinking agent, a hydrosilylation reaction promoting catalyst, and a reaction inhibitor are added.

6. The method according to claim 5,
    wherein the rubber composition has an induction time $t_c(10)$ (JIS K6300-2) at 110° C. of 10 minutes or more.

* * * * *